United States Patent
Ohshima et al.

(10) Patent No.: US 8,273,275 B2
(45) Date of Patent: Sep. 25, 2012

(54) MANUFACTURING METHOD AND MANUFACTURING APPARATUS FOR HOLLOW STRUCTURE OF IMAGE DISPLAY ELEMENT

(75) Inventors: Hisayoshi Ohshima, Kanagawa (JP); Masaru Ohgaki, Kanagawa (JP); Toshihiro Kanematsu, Kanagawa (JP); Masahiro Masuzawa, Chiba (JP); Shinya Seno, Kanagawa (JP); Shinji Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 272 days.

(21) Appl. No.: 12/303,873

(22) PCT Filed: Feb. 25, 2008

(86) PCT No.: PCT/JP2008/053718
§ 371 (c)(1),
(2), (4) Date: Dec. 8, 2008

(87) PCT Pub. No.: WO2008/108319
PCT Pub. Date: Sep. 12, 2008

(65) Prior Publication Data
US 2010/0129527 A1    May 27, 2010

(30) Foreign Application Priority Data
Mar. 8, 2007   (JP) .................. 2007-059117

(51) Int. Cl.
*B29C 44/20* (2006.01)
(52) U.S. Cl. ....... 264/45.8; 264/46.5; 264/51; 264/46.4; 264/139
(58) Field of Classification Search .................. None
See application file for complete search history.

(56) References Cited

U.S. PATENT DOCUMENTS

| | | | |
|---|---|---|---|
| 4,211,590 A * | 7/1980 | Steward et al. ................. | 156/79 |
| 5,314,737 A * | 5/1994 | Cohen et al. .................. | 428/156 |
| 6,930,818 B1 | 8/2005 | Liang et al. | |
| 7,604,761 B2 * | 10/2009 | Abrigo et al. ................ | 264/46.2 |
| 2002/0048234 A1 | 4/2002 | Terashi et al. | |
| 2004/0129382 A1 | 7/2004 | Terashi et al. | |
| 2006/0203179 A1 | 9/2006 | Kawase | |
| 2009/0273826 A1 | 11/2009 | Masuda et al. | |

FOREIGN PATENT DOCUMENTS

| | | |
|---|---|---|
| JP | 2001-315217 | 11/2001 |
| JP | 2004-189487 | 7/2004 |
| JP | 3680996 | 5/2005 |
| JP | 2006-189729 | 7/2006 |
| JP | 2007-98930 | 4/2007 |
| WO | WO2004/089434 A1 | 10/2004 |
| WO | WO2006/118116 A1 | 11/2006 |

OTHER PUBLICATIONS

Jul. 7, 2010 European search report in connection with counterpart European patent application No. 08721138.
U.S. Appl. No. 09/518,488, filed Mar. 3, 2000.

* cited by examiner

*Primary Examiner* — Monica A Huson
(74) *Attorney, Agent, or Firm* — Cooper & Dunham LLP (57) ABSTRACT

A disclosed method of manufacturing an image display element structure includes a coating step of coating a substrate surface including a plurality of recessed portions arranged at predetermined intervals, with a coating material that is plastic-deformable, in such a manner as to maintain spaces in the recessed portions; and an expanding step of forming gaps in the coating material coating the substrate surface by expanding gas in the spaces, wherein the gaps correspond to the recessed portions; and a peeling step of peeling off the coating material in which the gaps have been formed, from the substrate surface.

19 Claims, 7 Drawing Sheets

MANUFACTURING METHOD AND MANUFACTURING APPARATUS FOR HOLLOW STRUCTURE OF IMAGE DISPLAY ELEMENT

TECHNICAL FIELD

The present invention relates to a manufacturing method and a manufacturing apparatus for an image display element structure, and a manufacturing method and a manufacturing apparatus for an electrophoretic image display element employing the same.

BACKGROUND ART

CRTs and liquid crystal displays are widely used as terminals for displaying images such as characters, still images, and video images. With these devices, digital data can be instantaneously displayed and rewritten. However, these devices are not easy to carry around all the time. Furthermore, as these devices are self-luminous devices, they are disadvantageous in that human eyes may become fatigued by usage over a long period of time. Another disadvantage is that the displayed image cannot be saved if the power is turned off. Meanwhile, in order to distribute the characters and still images or to save them as documents, they are recorded onto a paper medium with a printer. A paper medium is widely used for producing hard copies. With the use of a hard copy, a user views a reflection caused by multi-scattering. Therefore, a hard copy is more advantageous than viewing a self-luminous device in terms of visibility, and causes less fatigue. Furthermore, a hard copy is light-weight and can be conveniently handled, and therefore the user can read a hard copy in any posture. However, after a hard copy is used, it may be discarded. Some paper sheets can be recycled, but recycling paper requires a tremendous amount of work and cost, which are problematic in terms of saving resources. In recent years and continuing, with the development of information devices, information processing such as creating documents can be performed with a computer. Accordingly, there are increasingly more opportunities for reading documents displayed on a display terminal.

Under such circumstances, there are increased requirements for a paper-like display medium that has both advantages of a display device and a hard copy, that can rewrite the data, and that is suitable for reading. There is a display medium realized with macromolecular dispersion type liquid crystal, bistable cholesteric liquid crystal, an electrochromic device, or an electrophoretic image display element. Recently, this type of display medium has been attracting attention because it can display a bright image even though it is a reflection type medium, and also because it is capable of saving images in its memory. A display medium realized with an electrophoretic image display element is particularly advantageous in terms of power consumption while displaying images. For example, patent document 1 discloses an invention based on such a principle.

A display medium employing an electrophoretic method has dispersion liquid encapsulated inside a colored dispersion medium between a set of transparent electrodes. Plural electrophoretic particles having a color different from that of the dispersion medium are dispersed in the dispersion liquid. The surfaces of the electrophoretic particles are electrically charged in the dispersion medium. Thus, if a voltage that attracts the charges of the electrophoretic particles is applied to one of the transparent electrodes, the electrophoretic particles will be attracted to and accumulated on that transparent electrode, and the color of the electrophoretic particles can be viewed. If a voltage that repels the charges of the electrophoretic particles is applied to one of the transparent electrodes, the electrophoretic particles will move toward the opposite transparent electrode, and the color of the dispersion medium can be viewed. An image can be displayed by utilizing such changes.

An electrophoretic image display element including a display medium employing such an electrophoretic method is an individual image display element. In order to realize an image display device, it is necessary to have multiple electrophoretic image display elements arranged within a microscopic area. Accordingly, a structure for arranging these elements is required. A sheet having a honeycomb structure, which is an assembly of plural hollow bodies, is known as a preferable structure for image display elements (image display element structure) for sectionalizing and arranging such microscopic elements. Electrophoretic particles and a dispersion medium are put in each honeycomb compartment, so that each honeycomb compartment acts as an image element, and the entire honeycomb structure acts as an image display device.

For example, patent document 2 discloses an electrophoretic image display and a manufacturing method thereof. This electrophoretic image display has plural cup-shaped recessed portions formed by a micro-embossing process or by image exposure. Each recessed portion is filled with charged dye particles that become dispersed in a solvent or a solvent blend. An overcoat layer is formed on the dispersed substance by a curing process. The overcoat layer is made of a sealing composition having a lower relative density than the dispersed substance, which sealing composition is at least partially nonmiscible with the dispersed substance. Accordingly, the recessed portion is sealed in such a manner that the dispersed substance is confined inside the recessed portion.

With respect to a method of manufacturing the image display element structure, patent document 3 discloses a method of manufacturing an anti-adhesive material made of a biodegradable film having a honeycomb structure. This honeycomb structure is formed with a biodegradable polymer and phosphorus surfactant. Due to the effects of the surfactant, the honeycomb structure is prevented from adhering to a biological body. Furthermore, the film thickness of this honeycomb structure is approximately 13 µm.

Patent Document 1: Japanese Laid-Open Patent Application No. 2004-189487

Patent Document 2: Japanese Patent No. 3680996

Patent Document 3: International Publication 2004/148680 Pamphlet

When the image display structure is applied as a display unit matrix of an image display device such as an electrophoretic image display, in order to display an image with high reflectance and high contrast, it is preferable that the image display structure have a high opening ratio, i.e., the partitioning walls between hollow bodies in the image display structure are preferably thin, particularly the partitioning walls on the displaying side.

In patent document 2, the honeycomb structure is formed by a micro-embossing process or by image exposure. In the case of a micro-embossing process, a die with patterns formed beforehand is used to emboss a precursor layer of thermoplastic or a thermosetting substance, which is coated on a conductive film. Subsequently, the precursor layer is cured by radiation, cooling, solvent evaporation, or by another method, and the cured precursor layer is removed from the die. In order to reduce the thickness of the walls in this method, the recessed portions of the die (between two protruding portions) need to be extremely thin. Hence, the precursor may not sufficiently enter the recessed portions such that the shape is not precisely transferred. Furthermore, when the intensity of the precursor is insufficient, some of the precursor may remain in the recessed portions of the die when the precursor is removed. Accordingly, it is difficult to form a honeycomb structure with hollow bodies with this method. Patent document 2 does not specifically describe the thickness of the walls partitioning the recessed portions. However, according to studies conducted by the inventors of the present invention, it is considered that when the partitioning walls are as thin as 10 μm or less, it is difficult to form a structure having a height that is greater than or equal to five times the wall thickness with the above method.

When forming the structure by image exposure, a conductive film coated with a radiation curing layer undergoes image exposure. Subsequently, after the exposed region becomes cured, the non-exposed region is removed. With this method, radiation is irradiated through a mask, or finely channeled radiation is directly irradiated onto the radiation curing layer to render a pattern. However, because the radiation light wraps around or scatters in the radiation curing layer, it is difficult to create walls of high aspect ratios.

Accordingly, there is a need for a manufacturing method and a manufacturing apparatus for an image display element structure having excellent reflectance and contrast. Furthermore, there is a need for a manufacturing method and a manufacturing apparatus for an electrophoretic image display element having excellent reflectance and contrast, employing the manufacturing method and the manufacturing apparatus for the image display element structure.

BRIEF SUMMARY

In an aspect of this disclosure, there are provided a manufacturing method and a manufacturing apparatus for manufacturing an image display element structure, and a manufacturing method and a manufacturing apparatus for manufacturing an electrophoretic image display element employing the same.

In another aspect, a method of manufacturing an image display element structure includes a coating step of coating a substrate surface including a plurality of recessed portions arranged at predetermined intervals, with a coating material that is plastic-deformable, in such a manner as to maintain spaces in the recessed portions; an expanding step of forming gaps in the coating material coating the substrate surface by expanding gas in the spaces, wherein the gaps correspond to the recessed portions; and a peeling step of peeling off the coating material in which the gaps have been formed, from the substrate surface.

In another aspect, there is provided an image display element structure manufacturing apparatus including a coating unit configured to coat a substrate surface including a plurality of recessed portions arranged at predetermined intervals, with a plastic-deformable material, in such a manner as to maintain spaces in the recessed portions; an expanding unit configured to form gaps in the plastic-deformable material coating the substrate surface by expanding gas in the spaces, wherein the gaps correspond to the recessed portions; and a peeling unit configured to peel off the plastic-deformable material in which the gaps have been formed, from the substrate surface.

In another aspect, a manufacturing method and a manufacturing apparatus for an image display element structure having excellent reflectance and contrast are provided. Further, a manufacturing method and a manufacturing apparatus for an electrophoretic image display element having excellent reflectance and contrast, employing the manufacturing method and the manufacturing apparatus of the image display element structure, are provided.

BEST MODE FOR CARRYING OUT THE INVENTION

A description is given, with reference to the accompanying drawings, of an embodiment of the present invention.

First Embodiment

Figure 1:
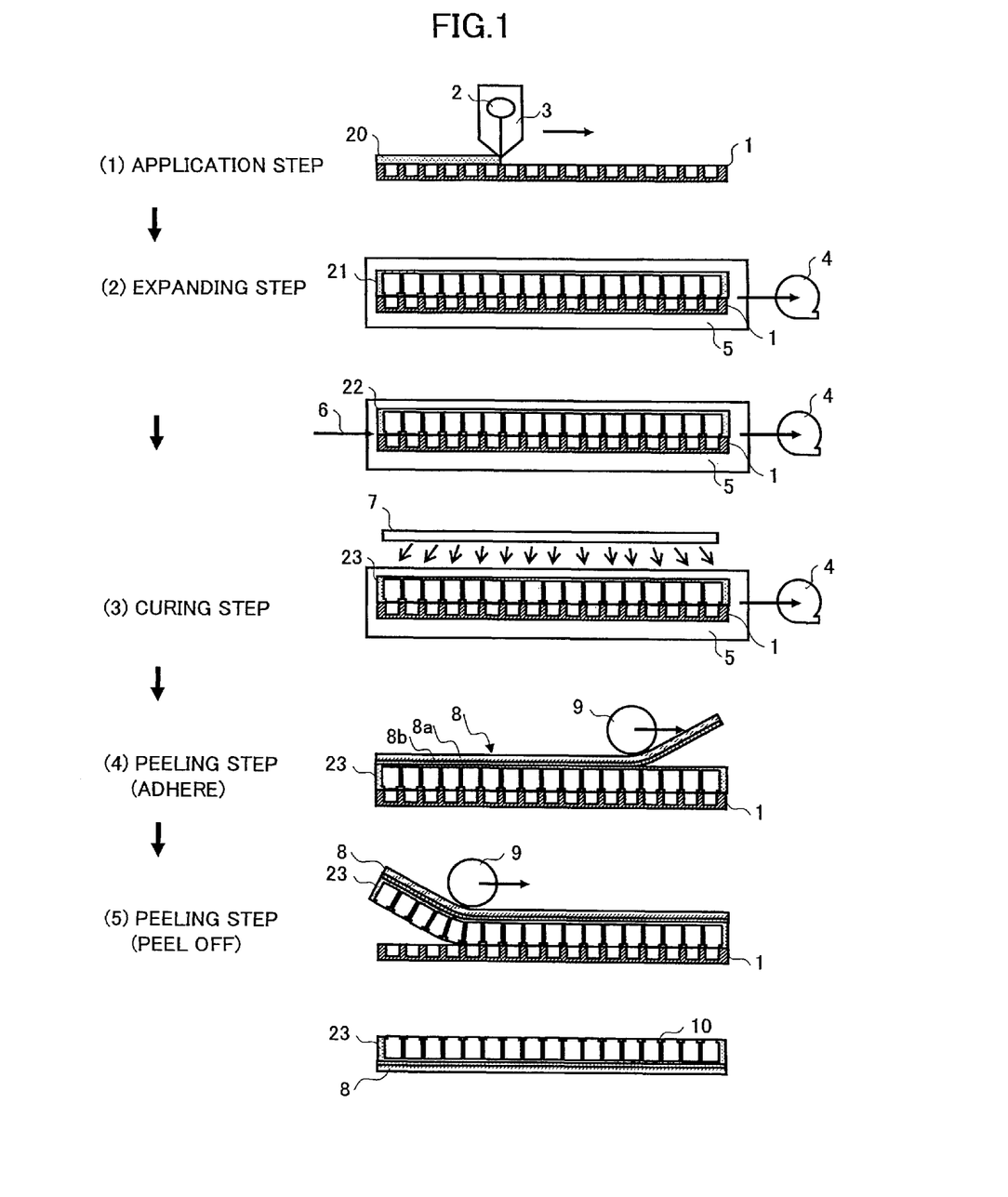
FIG. 1 is a manufacturing process chart of an image display element structure.

A description is given of a manufacturing method and a manufacturing apparatus for an image display element structure according to the first embodiment, with reference to the manufacturing process chart shown in FIG. 1.

In (1) an application step, a material 2 is applied, with an applying device 3, onto a substrate 1 having plural recessed portions arranged at predetermined intervals, maintaining a space in each of the recessed portions. This material 2 is capable of plastic deformation, and is used for forming hollow structures to be used for the image display elements. The applying device 3 is preferably capable of applying the plastic-deformable material 2 without causing the material 2 to enter the recessed portions on the substrate 1. The applying device 3 shown in FIG. 1 employs a slit coating method. Specifically, the plastic-deformable material 2 is supplied, at a constant speed, to a slit that extends lengthwise in the application width direction of the applying device 3. The material 2 is spread out in the width direction in the slit and is extruded from the slit in such a manner that it forms a film having a substantially desired thickness. By moving the silt or by moving the substrate 1 in a perpendicular direction with respect to the slit at a constant speed, an applied film of a certain thickness can be formed on the substrate 1. This applied film corresponds to a sheet 20 before expansion. Other application methods such as roll coating or curtain coating can also be performed.

In (2) an expanding step, the sheet 20 adhering on the surface of the substrate 1 is put into a decompression chamber 5. The atmosphere inside the decompression chamber 5 is evacuated with a vacuum pump 4, such that the pressure on the surface of the sheet 20, which surface is facing the recessed portions including the spaces, is relatively higher than that on the surface of the sheet 20 facing the outside. Thus, the gas inside the spaces of the recessed portions will expand, and therefore the sheet 20 expands toward its outside surface, corresponding to each of the recessed portions with spaces. Accordingly, the sheet 20 has a structure with gaps expanding/extending in its thickness direction, which gaps correspond to the recessed portions with spaces. As the pressure inside the decompression chamber 5 is adjusted, each gap in the sheet 20 will grow by extending the material between adjacent gaps. When each gap has grown to its limit in the horizontal direction (direction parallel with respect to the sheet surface), each gap's growing will be concentrated in the vertical direction (direction vertical with respect to the sheet surface). Finally, an expanded sheet 21 with a honeycomb structure is formed, having thin partitioning walls between the gaps, with each gap having a high aspect ratio, largely extending in the vertical direction.

The recessed portions on the substrate surface can form a pattern in which the recessed portions are arranged in a staggered manner at 60 degrees or at 45 degrees, or a pattern in which the recessed portions are arranged in a parallel manner at 90 degrees. If the recessed portions are arranged in a staggered manner at 60 degrees, each of the gaps of the honeycomb structure will be a hexagonal pillar with a hexagonal cross-sectional shape. If the recessed portions are arranged in a staggered manner at 45 degrees or in a parallel manner at 90 degrees, each of the gaps of the honeycomb structure will be a quadratic pillar with a square cross-sectional shape. By adjusting the pressure in the decompression chamber 5, the honeycomb structure can be made to have gaps with circular or oval cross-sectional shapes.

The decompression chamber as shown in FIG. 1 is used as the expanding mechanism for making the pressure in the recessed portions with spaces different from the pressure of the atmosphere around the substrate 1. Another example of such an expanding mechanism is a mechanism of heating the substrate 1 to increase the pressure in the spaces of the recessed portions on the surface of the substrate 1. Furthermore, an expanding agent can be provided inside the gaps to increase the pressure in the gaps. In order to make the expanded sheet 21 have a constant thickness and to make the gaps have uniform shapes, the plastic-deformability needs to be uniform across the entire material to be expanded, and the temperature and/or the humidity of the atmosphere in the decompression chamber 5 is preferably controlled.

In (3) a curing step, the material is cured so that the expanded sheet 21 does not plastically deform and break when the difference in pressure is eliminated. If the plastic-deformable material is a water soluble resin, it can be cured by removing the moisture, which is the solvent. The expanded sheet 21 can be cured by being left in a decompressed environment or removing the moisture with a dry air current in a decompressed environment. By using a dry air current, it is possible to control the balance between the pressure and the flow rate of the dry air current, which makes it easy to control the thickness of the walls partitioning the gaps in the structure. Furthermore, this method is characterized in that the device has a simple structure. Meanwhile, if the plastic-deformable material is an energy-line curing resin, an energy line irradiating unit 7 may be used as a curing unit. By this method, the expanded sheet 21 can be cured within a short period of time. This curing step can be omitted if the sheet 21 can be cured in the above-described expanding step to an extent that the honeycomb structure will not break or deform in the peeling step described below or when it is used as an image display element structure. The expanded sheet 21 is cured in the above-described manner, thereby forming a cured sheet 22 or 23.

In (4) the peeling step, the cured sheet 23 is peeled off the substrate 1 with a peeling unit, thereby manufacturing the sheet 23 that is a hollow structure including thin films, which can be used for the image display elements. A peeling base 8, which includes a base sheet 8a onto which an adhesive or viscous material 8b is applied, is used as a peeling unit. The peeling step is preferably performed by adhering the peeling base 8 onto the sheet 23 by pressing it with a roller 9, and then peeling off the peeling base 8 and the sheet 23 together from the substrate 1. By the method of adhering the peeling base 8 to the sheet 23 and then peeling off the sheet 23, even if the sheet 23 has thin walls between its gaps and is difficult to handle, the sheet 23 can be peeled off from the substrate 1 without being damaged. By treating the peeling base 8 such that it can be peeled off from an adhesive or a viscous material, the peeling base 8 can be used as an adhesive layer when the electrophoretic image display elements are to be adhered to a back-surface driving substrate (a backplane). Furthermore, by using, as the peeling base 8, a transparent film that has attached a transparent electrode, the peeling base 8 can be used as the display side of the electrophoretic image display elements.

With the above described method of manufacturing an image display element structure, it is possible to form an image display element structure having thin walls partitioning the cells of the honeycomb structure. By using this as an image display element member, image properties can be improved, such as the reflectance and the contrast of the image display elements.

Second Embodiment

Figure 3:
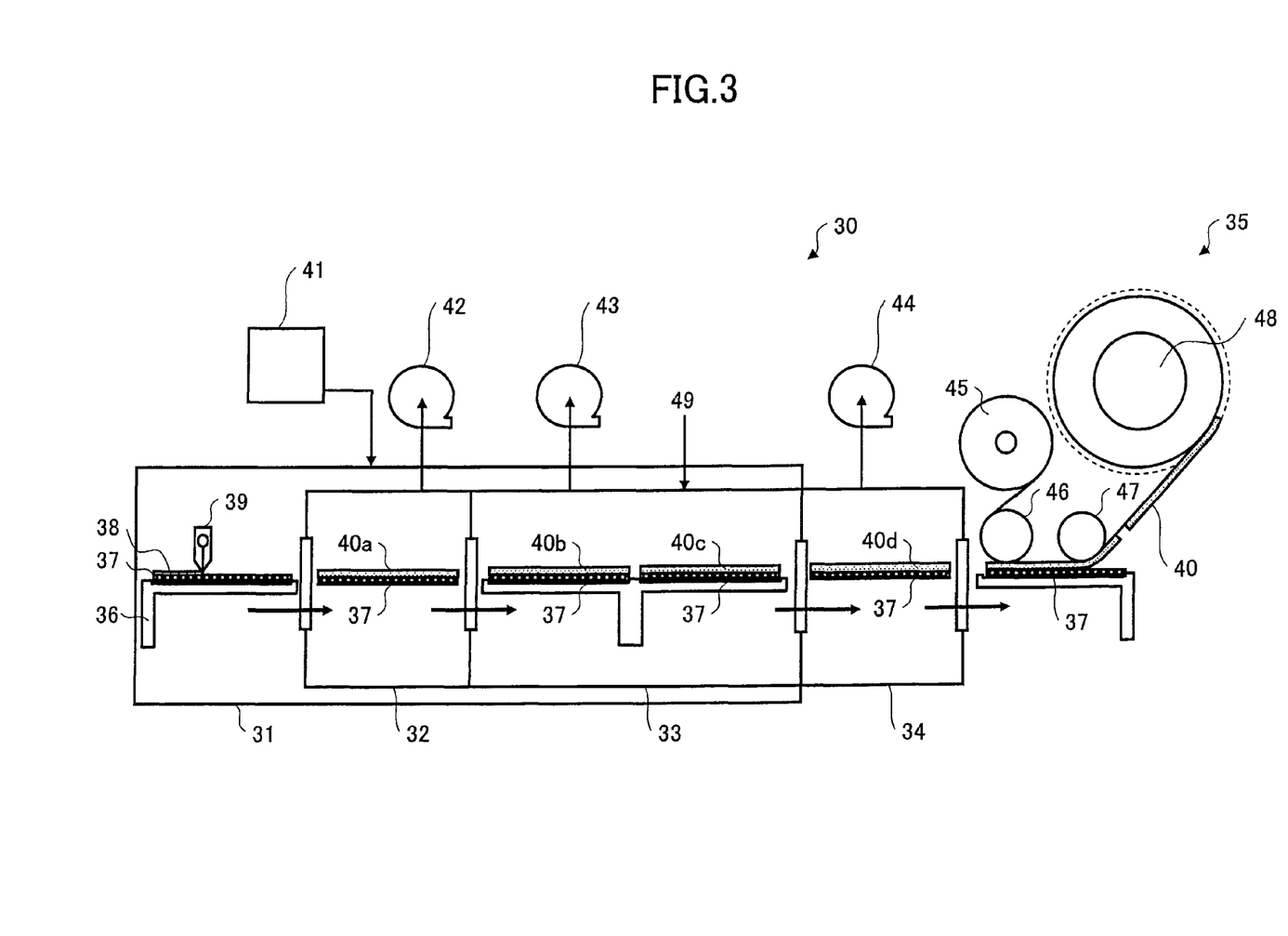
FIG. 3 illustrates a continuous manufacturing apparatus for the image display element structure.

With reference to FIG. 3, a description is given of a continuous manufacturing apparatus 30 for an image display element structure (the cured sheet 22), which is fabricated with a plastic-deformable material that is a specific water soluble resin. The manufacturing apparatus 30 includes a temperature/humidity control chamber 31, a decompression chamber 32, a decompression drying chamber 33, a pressure raising chamber 34, and a peeling device 35. The water soluble resin used as a plastic-deformable material 38 is gelatin MC-243 manufactured by Jellice Co., Ltd. The gelatin is dissolved with pure water to around 5 wt % through 30 wt %, thereby forming a gelatin water solution.

This gelatin water solution is evenly applied onto a substrate 37 with a slit coater acting as an applying device 39, in such a manner that the gelatin water solution has a thickness of 40 μm through 50 μm. The substrate 37 has recessed portions arranged in a staggered manner at 60 degrees at pitches of 150 μm. At this stage, the substrate 37 is placed on a support stand 36. Accordingly, sheet 40a before expansion is formed. At the time of application, the gelatin water solution is heated to 50° C., which is greater than or equal to a gelling temperature, and its viscosity is decreased to around 80 cP through 100 cP. The gelatin water solution is applied in the temperature/humidity control chamber 31 that is controlled to have a temperature of 25° C. and a humidity of 40%. By controlling the temperature and the humidity in the temperature/humidity control chamber 31, the thickness of an expanded sheet 40b and thicknesses of walls between gaps can be made even, thereby forming the sheet 40b with favorable reproducibility ((1) application step).

The substrate 37, which has the sheet 40a before expansion formed on its surface, is put into a decompression casing. The decompression casing includes three chambers—the decompression chamber 32, the decompression drying chamber 33, and the pressure raising chamber 34. The sheet 40a before expansion, which is formed on the substrate 37, is subjected to decompression of 0.005 MPa by a vacuum pump 42, approximately one minute after being applied on the substrate 37, in the decompression chamber 32 maintained at a temperature of 25° C. and a humidity of 40%, which are maintained by a temperature/humidity control device 41. Accordingly, the gaps of the sheet 40a are made to be hexagonal pillars, thereby forming the expanded sheet 40b having a honeycomb structure ((2) expanding step). By controlling the temperature and the humidity in the decompression chamber 32 with the temperature/humidity control device 41, the thickness of an expanded sheet 40b and thicknesses of walls between gaps can be made even, thereby forming the sheet 40b with favorable reproducibility.

When the gaps in the sheet 40a are formed and a vacuum pump 43 reduces the pressure in the decompression chamber 32 to be 0.005 Mpa, which is the same as that in the decompression drying chamber 33, the partitioning wall inside the decompression chamber 32 opens, and the sheet 40b that has been expanded is put into the decompression drying chamber 33 together with the substrate 37. While maintaining the decompressed state in the decompression drying chamber 33, dry gas 49 having a temperature of around 25° C. and a humidity of around 15% is set into the decompression drying chamber 33, thereby curing the sheet 40b by evaporating its moisture. If the sheet 40b is an A6 sized sheet, the time required for drying/curing is approximately three minutes with a dry air current with a flow rate of approximately 5 L/minute. A cured sheet 40c is moved from the decompression drying chamber 33 to the pressure raising chamber 34 that is decompressed by a vacuum pump 44, and while the partitioning wall inside the pressure raising chamber 34 is closed, the pressure is raised to atmospheric pressure. When the pressure inside the boosting chamber 34 has reached atmospheric pressure, the partitioning wall on the outside of the decompression casing opens, and a expanded, dried, and cured sheet 40d on the substrate 37 exits the decompression casing ((3) curing step).

A peeling base 45 used for peeling is reeled out from a reel and is adhered, with a pressing roller 46, onto the sheet 40d that has exited the decompression casing. Then, the sheet 40d is peeled off from the substrate 37 with a pressing roller 47, and is wound around a reel 48 ((4) peeling step). The sheet 40 having a honeycomb structure, which has been wound around the reel 48, has a thickness of 50 μm through 60 μm, and the thickness of each of the walls in the honeycomb structure is around 3 μm through 5 μm.

Examples of the plastic-deformable material are polyvinyl alcohol, polyvinyl pyrrolidone, polyurethane, pullulan, albumin, CMC, polyacrylic acid, cellulose, starch, gelatin, alginate, guar gum, Arabic gum, carageenan, tragacanth, pectin, dextrin, casein, collagen, polyvinyl methyl ether, carboxy vinyl polymer, sodium polyacrylate, polyethylene glycol, ethylene oxide, agar, Locust bean gum, xanthan gum, cyclodextrin, tannic acid, karaya gum, gellan gum, furcellaran, tragacanth gum, lecithin, chitin chitosan, sodium chondroitin sulfate, lignin sulphonic acid, methyl cellulose, hydroxymethyl cellulose, polyacrylamide, polyethyleneimine, dimethylaminoethyl acrylate, dimethylaminoethyl methacrylate, polyethylene oxide, polyallylamine, urethane acrylic UV curing resin, epoxy acrylic UV curing resin, and alkoxy acrylic UV curing resin. Specific product names include HYDRAN WLS-201 (manufactured by Dainippon Ink and Chemicals Incorporated) to be used as polyurethane and gelatin MC-243 (manufactured by Jellice Co., Ltd.) to be used as gelatin that is a water soluble resin, and these are dissolved with water to around 5 wt % through 30 wt %. Poval PVA117 (manufactured by KURARAY CO., LTD.) for use as polyvinyl alcohol is dissolved with water to around 5 wt % through 30 wt %.

Examples of the substrate material are nickel, silicon, glass onto which a pattern is formed with a resist agent, a copper-clad sheet (a substrate on which copper/polyimide are laminated), glass, and other resin materials (polyimide, PTE, acryl, etc.). Favorable examples are a nickel die with which electrodeposition is performed, glass onto which a pattern is formed with a resist agent, a copper-clad sheet (a substrate on which copper/polyimide are laminated), etched glass, and silicon. The material can be selected according to cost, precision, and whether a large area is required. However, because the pattern is not required to be strictly precise, any manufacturing method and any material are applicable. A resin material is applicable.

Third Embodiment

A description is given of a method of manufacturing an image display element structure according to a third embodiment of the present invention that is similar to that of the second embodiment. The (1) application step in FIG. 1 involved applying the water soluble material 2 onto the substrate 1 with plural predetermined recessed portions, which substrate 1 is bonded onto a glass plate with favorable flatness. Upon controlling the temperature of the water soluble material 2, the water soluble material 2 is sent out onto the substrate 1 from the applying device 3 including a discharging pump, and at the same time the substrate 1 is moved so that a uniform film is formed on the substrate 1. The film is formed in such a manner as to maintain spaces in the recessed portions on the substrate 1. A solution, which is obtained by diluting gelatin MC-243 (manufactured by Jellice Co., Ltd.) with pure water by four through five times, is used as the water soluble material 2. The water soluble material 2 is heated to approximately 55° C. and then applied to the substrate 1. The thickness of the applied gelatin is approximately 50 μm.

Subsequently, the entire glass plate, i.e., the substrate 1 onto which the film is formed, is sent into a decompression device, and decompression and expanding is performed. For example, as shown in FIG. 3, the entire glass plate, i.e., the substrate 1 onto which the film is formed, is supplied into the chamber that is evacuated to a certain vacuum degree, so that the film forms a honeycomb structure. At this time, the absolute pressure is $5 \times 10^2$ Pa. After being dried the substrate 1 is removed from the chamber. At this time, the height of the honeycomb is approximately 100 μm.

Subsequently, the honeycomb structure film is separated from the substrate 1, thereby attaining an image display element structure. In order to inject functional materials such as an electrophoretic dispersion liquid into the gaps of the formed honeycomb structure, it is necessary to inject the functional materials through the openings in the honeycomb structure which are formed on the side that had been separated from the substrate 1. If the openings are not wide enough, the opening diameters can be controlled by exposing the soluble material. For example, each opening can be increased from 40 μm to 80 μm by making the honeycomb structure pass through a chamber filled with steam with a temperature of 60° C., so that the electrophoretic agent can be injected. Furthermore, images can be displayed by sealing the honeycomb structure with a high polymer material and applying an electric field of 10 V.

Fourth Embodiment

Figure 2:
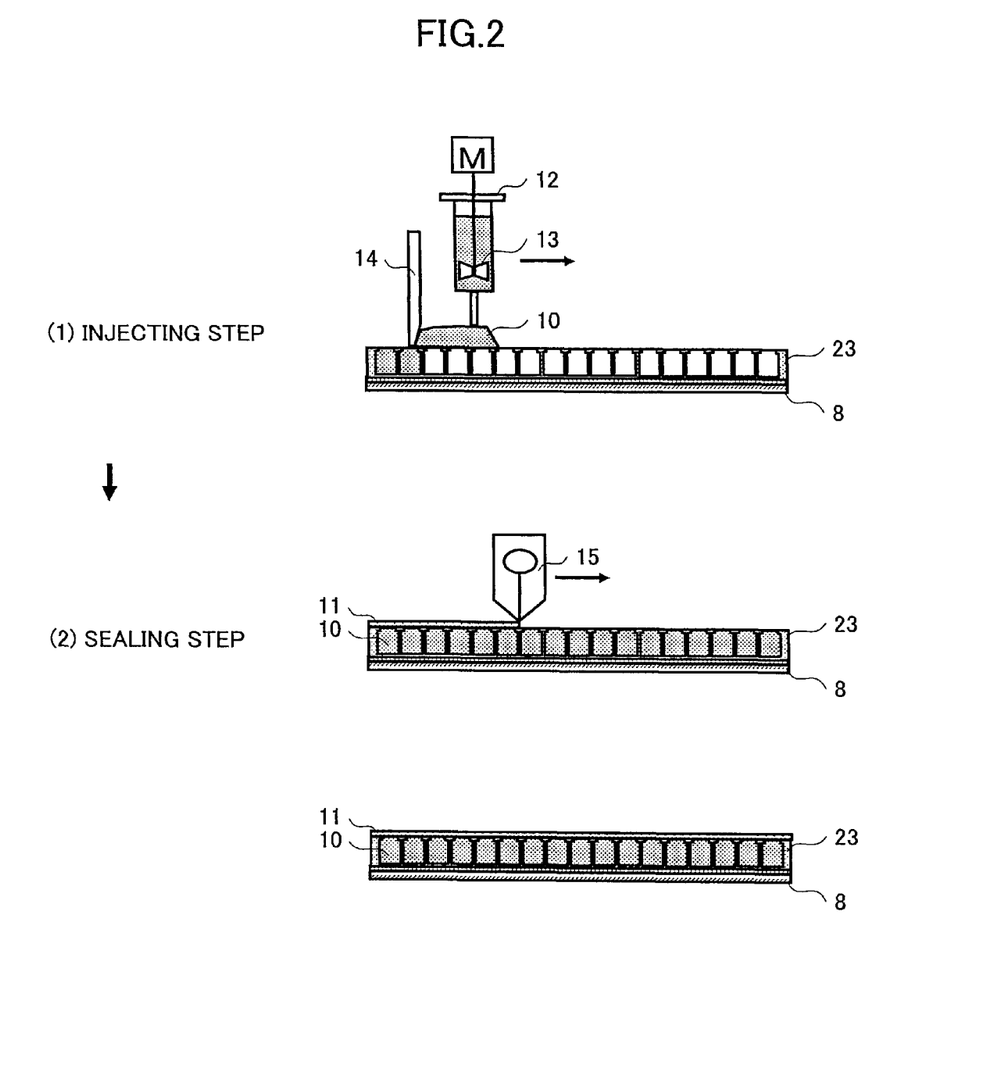
FIG. 2 is a manufacturing process chart of electrophoretic image display elements.

A description is given of a fourth embodiment of the present invention which is a manufacturing method and a manufacturing apparatus of the electrophoretic image display elements employing the above-described image display element structure (e.g., sheet 23), with reference to a manufacturing process chart shown in FIG. 2. The manufacturing method of the electrophoretic image display elements includes (1) an injecting step and (2) a sealing step.

In the (1) injecting step, a dispersion liquid 10 including a nonpolar solvent and dye having at least one type of electrophoretic property dispersed in a solvent is injected with the use of an injecting unit such as an injecting device 12. If the dispersed dye is left untreated, separation may occur. In order to inject a uniform dispersion liquid into all of the gaps in the sheet 23, the dispersion liquid is preferably stirred by a stirring device 13 inside the injecting device 12 while being applied to the surface of the sheet 23 having the openings of the gaps. In this situation, the dispersion liquid 10 may not be completely injected into the gaps of the sheet 23. Therefore the surface of the sheet 23 having the dispersion liquid 10 applied thereon is rubbed with a roller or a blade 14 in order to press the dispersion liquid 10 into the gaps. Accordingly, the uniformly dispersed dispersion liquid 10 is completely injected into the gaps of the honeycomb structure of the sheet 23. In the illustrated example of a stirring unit, the stirring device 13 rotates the dispersed dye inside the solvent. However, an ultrasonic oscillator can be attached to a path or a nozzle through which the dispersion liquid 10 is supplied, so that the liquid to be injected is stirred by ultrasonic oscillation. With such a configuration, even if the dye tends to settle easily, a uniform dispersion liquid 10 can be injected into the gaps of the honeycomb structure.

In (2) the sealing step, a sealing material 11 that is incompatible with the solvent of the dispersion liquid 10 is used to seal the openings of the gaps in the sheet 23. The sealing unit includes an applying unit and a curing unit. The applying unit is for applying the sealing material 11 onto the surface of the sheet 23 having the openings of the gaps including the injected dispersion liquid 10. The curing unit is for curing the applied sealing material 11 and joining the sealing material 11 with the sheet 23. The applying unit preferably employs a noncontact applying method such as slit coating, curtain coating, or spray coating, which does not affect the injected dye.

As for the curing unit, a heating/drying unit for evaporating moisture is to be used if the sealing material is a gelatin solution, and an energy line irradiating unit is to be used if the sealing material is an energy-line curing resin. If the solvent of the dispersion liquid has bad compatibility with the sealing material, and a phenomenon such as repellence occurs, it may not be possible to directly apply the sealing material 11. In such a case, a sealing film, an adhesive layer or a viscous layer can be applied to the sealing material 11, and the sealing film or the adhesive layer/viscous layer can be adhered to the surface of the sheet 23 having the openings of the gaps. In this case, the sealing film formed on the sealing material 11 may seal the dispersion liquid 10, or if the strength of the sealing film is insufficient, the strength of the sealing material 11 is used to seal the dispersion liquid 10. However, if the sealing material 11 is made of a material that is cured by evaporating the solvent, it may not be possible to use a sealing film, an adhesive layer, or a viscous layer. Nevertheless, if a sealing film, an adhesive layer, or a viscous layer is formed beforehand, and one of these is directly transferred onto the sealing material 11 without using a base, it may be possible to use the sealing film, the adhesive layer, or the viscous layer even if the sealing material 11 is made of a material that is cured by evaporating the solvent.

Figure 4:
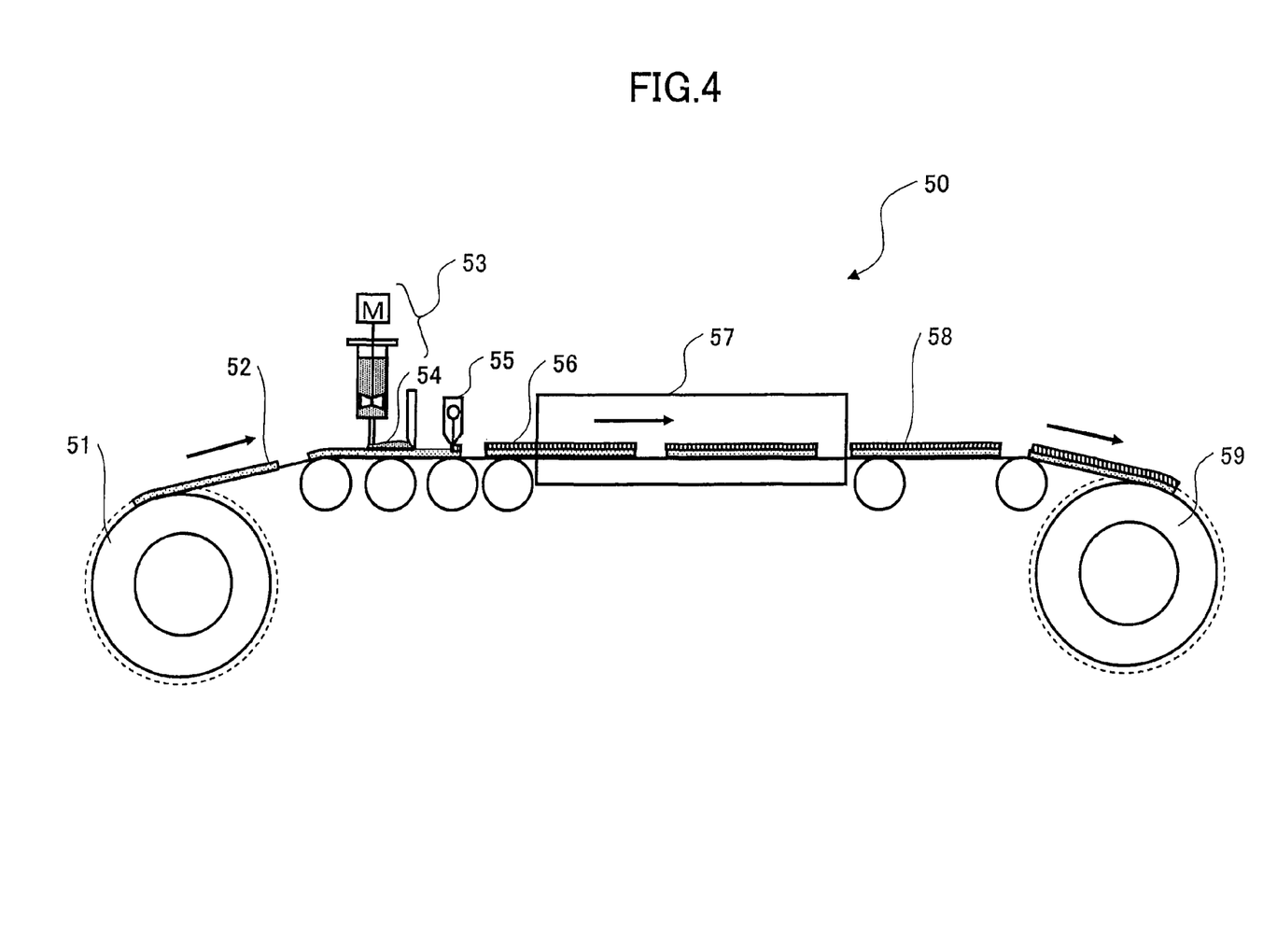
FIG. 4 illustrates a manufacturing apparatus (injection/sealing) for the electrophoretic image display elements.

FIG. 4 illustrates a continuous manufacturing apparatus 50 for electrophoretic image display elements. In FIG. 4, an image display element structure 52 that is wound around a reel 51 is continuously unwound. A dispersion liquid 54 for electrophoresis is injected through the openings of the gaps of the image display element structure 52 with an injecting device 53. In order to completely inject the dispersion liquid 54 into the gaps, the dispersion liquid 54 on the surface of the image display element structure 52 is pressed with a blade. A sealing device 55 is used to form a sealing film 56 on the surface of the image display element structure 52 on which the dispersion liquid 54 is injected. The sealing film 56 is dried with a drying device 57 to complete the sealing. Electrophoretic image display elements 58 that have been completely sealed are wound around a winding-up reel 59 and stored therein.

Figure 5A:
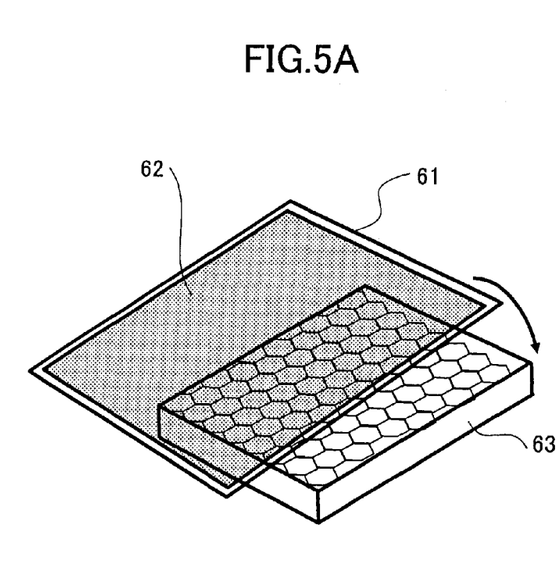
FIGS. 5A and 5B illustrate a sealing process performed with a sealing film that is a soap film formed beforehand.
Figure 5B:
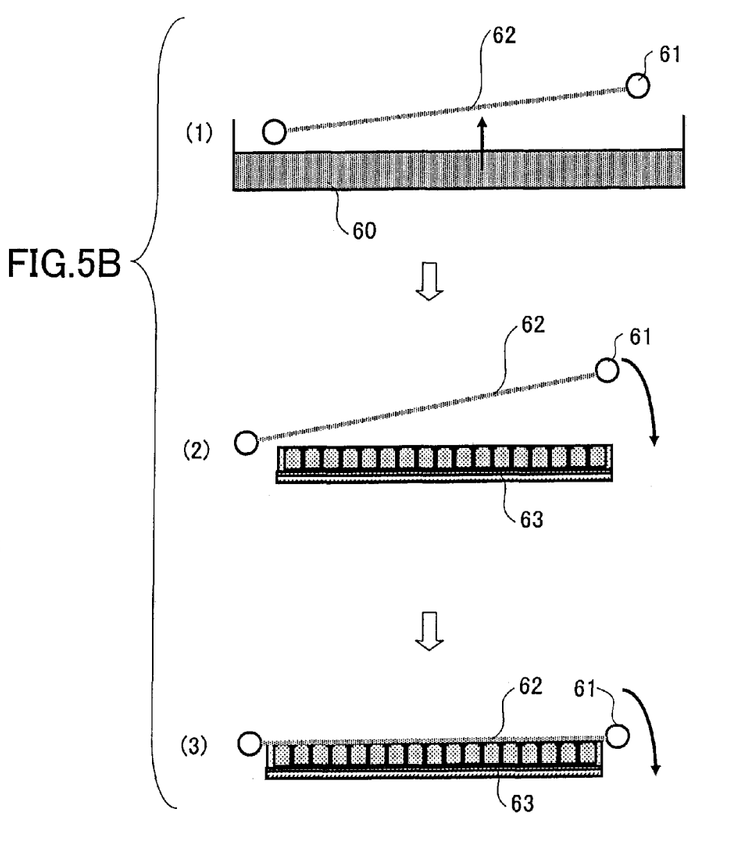

As shown in FIGS. 5A and 5B, the sealing film can be formed along the inner circumference of a frame used for film formation in such a manner as to form a soap film. Referring to FIG. 5B, (1) a frame 61 for film formation is impregnated into a sealing material 60, and a sealing film 62 is formed on the frame 61. Next, (2) the sealing film 62 is adhered to the surface of an image display element structure 63 on the side with openings (see (FIG. 5A)). Then, (3) when the sealing film 62 has been adhered to the surface of the image display element structure 63, the sealing is completed. If necessary, the solvent, which is included in the sealing material 60 that forms the sealing film 62, is removed.

Figure 6:
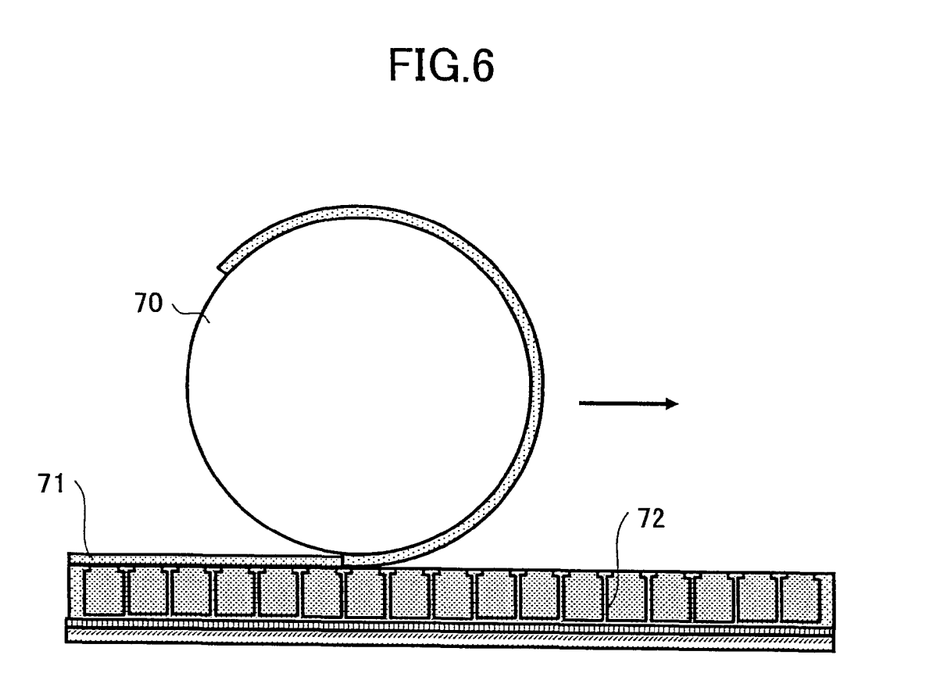
FIG. 6 illustrates a sealing process performed with a sealing film that is formed on a transfer body beforehand.

Furthermore, as shown in FIG. 6, the image display element structure can be sealed with a sealing material that is a transfer body that has undergone a peeling process. Referring to FIG. 6, a sealing material 71 that is wound around a reel 70 seals the surface of an image display element structure 72 as it is unwound from the reel 70. If an adhesive agent or a viscous agent is applied on the surface of the sealing material 71, the sealing material 71 easily adheres to the surface of the image display element structure 72 and seals the image display element structure 72.

Figure 7A:
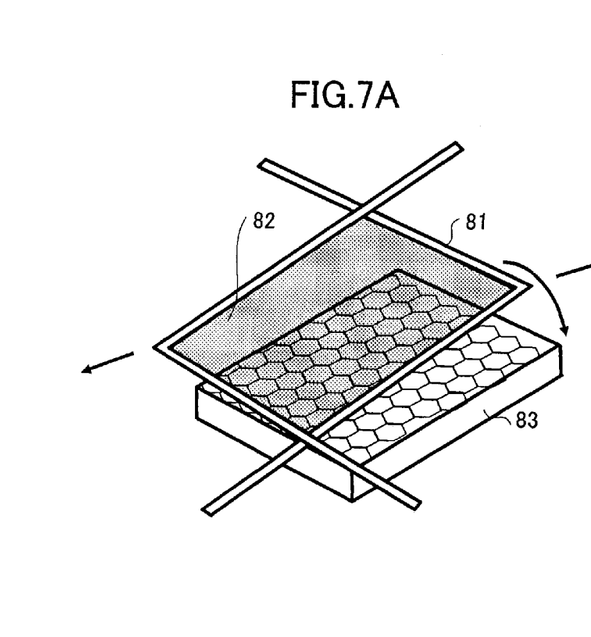
FIGS. 7A and 7B illustrate a sealing process performed while stretching a sealing film that is a soap film formed beforehand.
Figure 7B:
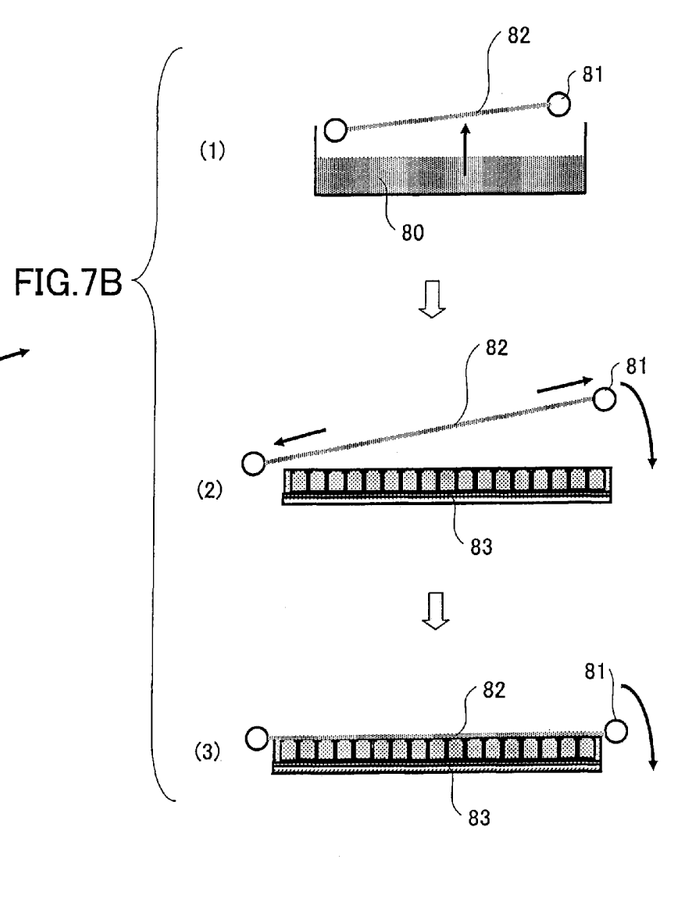

FIGS. 7A and 7B illustrate an example of stretching the sealing film described with reference to FIGS. 5A and 5B. As shown in FIG. 7B, a sealing film 132 (see (1)) formed with a sealing material 80 is stretched with a film forming frame 81 acting as a stretching unit (see (FIG. 7A)). Accordingly, a thinner sealing film (less than or equal to 1 μm) can be used to seal an image display element structure 83 (see (2) and (3)). By stretching the sealing film 82 and making it thinner, it is not only possible to make the sealing film 82 having a certain strength but it is also possible to manufacture an electrophoretic image display element that can be driven with low voltage.

The electrophoretic image display element described in the third embodiment uses an image display element structure that is a sheet with a certain thickness, that has a high opening ratio, and that has thin walls partitioning the gaps. Therefore, by injecting a dispersion liquid for electrophoresis in this electrophoretic image display element and sealing the dispersion liquid therein, it is possible to attain an electrophoretic image display element with excellent image properties such as the reflectance and the contrast.

According to one embodiment of the present invention, a method of manufacturing an image display element structure includes coating step of coating a substrate surface including a plurality of recessed portions arranged at predetermined intervals, with a coating material that is plastic-deformable, in such a manner as to maintain spaces in the recessed portions; an expanding step of forming gaps in the coating material coating the substrate surface by expanding gas in the spaces, wherein the gaps correspond to the recessed portions; and a peeling step of peeling off the coating material in which the gaps have been formed, from the substrate surface.

According to one embodiment of the present invention, the method of manufacturing the image display element structure further includes, before the peeling step, a curing step of curing the coating material in which the gaps have been formed in the expanding step.

According to one embodiment of the present invention, in the method of manufacturing the image display element structure, the expanding step includes a step of reducing pressure on a surface of the coating material coating the substrate surface so as to have lower pressure than the gas in the spaces in the recessed portions, and forming the gaps in the coating with an expansion force of the gas in the spaces in the recessed portions.

According to one embodiment of the present invention, in the method of manufacturing the image display element structure, the coating material is a plastic-deformable material which is sheet-like.

According to one embodiment of the present invention, in the method of manufacturing the image display element structure, the coating step includes an applying step of applying the coating material on the substrate surface in such a manner as to maintain the spaces in the recessed portions of the substrate surface.

According to one embodiment of the present invention, in the method of manufacturing the image display element structure, the coating material includes a solution of a water soluble resin; and the curing step includes a step of drying and curing the coating material in which the gaps have been formed under a depressurized environment or in a dry air current.

According to one embodiment of the present invention, in the method of manufacturing the image display element structure, the coating material includes an energy-line curing resin; and the curing step includes a step of curing the coating material in which the gaps have been formed by irradiating the coating material with energy lines.

According to one embodiment of the present invention, in the method of manufacturing the image display element structure, the expanding step includes a step of controlling at least one of a temperature and a humidity of an atmosphere.

According to one embodiment of the present invention, in the method of manufacturing the image display element structure, the peeling step includes a step of peeling off the coating material that has been cured from the substrate surface by adhering the coating material to a base to which an adhesive material or a viscous material has been applied.

According to one embodiment of the present invention, an image display element structure manufacturing apparatus includes a coating unit configured to coat a substrate surface including a plurality of recessed portions arranged at predetermined intervals, with a plastic-deformable material, in such a manner as to maintain spaces in the recessed portions; an expanding unit configured to form gaps in the plastic-deformable material coating the substrate surface by expanding gas in the spaces, wherein the gaps correspond to the recessed portions; and a peeling unit configured to peel off the plastic-deformable material in which the gaps have been formed, from the substrate surface.

According to one embodiment of the present invention, the image display element structure manufacturing apparatus further includes a curing unit configured to cure the plastic-deformable material in which the gaps have been formed, wherein the peeling unit peels off the plastic-deformable material which has been cured and in which the gaps have been formed, from the substrate surface.

According to one embodiment of the present invention, in the image display element structure manufacturing apparatus, the expanding unit expands the gas in the spaces in the recessed portions by reducing pressure on a surface of the plastic-deformable material coating the substrate surface, and forms the gaps in the plastic-deformable material coating the substrate surface with an expansion force of the gas.

According to one embodiment of the present invention, in the image display element structure manufacturing apparatus, the coating unit includes an attaching unit configured to attach the plastic-deformable material which is sheet-like to the substrate surface in such a manner as to maintain the spaces in the recessed portions of the substrate surface.

According to one embodiment of the present invention, in the image display element structure manufacturing apparatus, the coating unit includes an applying unit configured to apply the plastic-deformable coating material on the substrate surface in such a manner as to maintain the spaces in the recessed portions of the substrate surface.

According to one embodiment of the present invention, in the image display element structure manufacturing apparatus, the plastic-deformable material includes a solution of a water soluble resin; and the curing unit dries and cures the plastic-deformable material in which the gaps have been formed under a depressurized environment or in a dry air current.

According to one embodiment of the present invention, in the image display element structure manufacturing apparatus, the plastic-deformable material includes an energy-line curing resin; and the curing unit cures the plastic-deformable material in which the gaps have been formed by irradiating the plastic-deformable material with energy lines.

According to one embodiment of the present invention, in the image display element structure manufacturing apparatus, the expanding unit controls at least one of a temperature and a humidity of an atmosphere.

According to one embodiment of the present invention, in the image display element structure manufacturing apparatus, the peeling unit peels off the plastic-deformable material that has been cured from the substrate surface by adhering the plastic-deformable material to a base to which an adhesive material or a viscous material has been applied.

According to one embodiment of the present invention, a method of manufacturing an electrophoretic image display element includes an injecting step of injecting, into the gaps formed in the image display element structure manufactured by the above method, a dispersion liquid including a nonpolar solvent and dye dispersed in the nonpolar solvent, which dye has at least one type of an electrophoretic property; and a sealing step of sealing openings of the gaps into which the dispersion liquid has been injected.

According to one embodiment of the present invention, in the method of manufacturing the electrophoretic image display element, the injecting step includes a step of applying the dispersion liquid onto the openings of the gaps formed in the image display element structure, and injecting the dispersion liquid into the gaps by pressing the dispersion liquid with a roller or a blade.

According to one embodiment of the present invention, in the method of manufacturing the electrophoretic image display element, the sealing step includes a step of adhering, to the openings of the gaps, a sealing member onto which a sealing film, an adhesive layer, or a viscous layer has been formed beforehand.

According to one embodiment of the present invention, in the method of manufacturing the electrophoretic image display element, the sealing step includes a step of transferring a sealing film that has been formed beforehand onto a surface having the openings of the gaps.

According to one embodiment of the present invention, in the method of manufacturing the electrophoretic image display element, the sealing step includes a step of sealing the openings with a sealing film that has been stretched to have a small film thickness.

According to one embodiment of the present invention, the method of manufacturing the electrophoretic image display element further includes an ultrasonic vibration step of stirring the dispersion liquid when the dispersion liquid is being injected into the gaps formed in the image display element structure.

According to one embodiment of the present invention, an electrophoretic image display element manufacturing apparatus includes the above image display element structure manufacturing apparatus, further including an injecting unit configured to inject, into the gaps formed in the image display element structure, a dispersion liquid including a nonpolar solvent and dye dispersed in the nonpolar solvent, which dye has at least one type of an electrophoretic property; and a sealing unit configured to seal openings of the gaps into which the dispersion liquid has been injected.

According to one embodiment of the present invention, in the electrophoretic image display element manufacturing apparatus, the injecting unit applies the dispersion liquid onto the openings of the gaps formed in the image display element structure, and injects the dispersion liquid into the gaps by pressing the dispersion liquid with a roller or a blade.

According to one embodiment of the present invention, in the electrophoretic image display element manufacturing apparatus, the sealing unit adheres, to the openings of the gaps, a sealing member onto which a sealing film, an adhesive layer, or a viscous layer has been formed beforehand.

According to one embodiment of the present invention, in the electrophoretic image display element manufacturing apparatus, the sealing unit transfers a sealing film that has been formed beforehand onto a surface having the openings of the gaps.

According to one embodiment of the present invention, in the electrophoretic image display element manufacturing apparatus, the sealing unit seals the openings with a sealing film that has been stretched to have a small film thickness.

According to one embodiment of the present invention, the electrophoretic image display element manufacturing apparatus further includes an ultrasonic vibration unit configured to stir the dispersion liquid when the dispersion liquid is being injected into the gaps formed in the image display element structure.

The present invention is not limited to the specifically disclosed embodiment, and variations and expansions may be made without departing from the scope of the present invention.

The present application is based on Japanese Priority Patent Application No. 2007-059117, filed on Mar. 8, 2007, the entire contents of which are hereby incorporated by reference.

The invention claimed is:

1. A method of manufacturing an image display element structure, the method comprising:
    a coating step of coating a substrate surface comprising a plurality of recessed portions arranged at predetermined intervals, with a coating material that is plastic-deformable, in such a manner as to maintain spaces in the recessed portions;
    an expanding step of forming gaps in the coating material coating the substrate surface by expanding gas in the spaces, wherein the gaps correspond to the recessed portions; and
    a peeling step of peeling off the coating material in which the gaps have been formed, from the substrate surface.

2. The method according to claim 1, wherein the gaps formed in the coating material coating the substrate surface by expanding gas in the spaces have a hollow structure.

3. The method according to claim 1, wherein the coating material peeled off the substrate surface has a hollow structure.

4. An image display element structure manufacturing apparatus comprising:
    a coating unit configured to coat a substrate surface comprising plural recessed portions arranged at predetermined intervals, with a plastic-deformable material, in such a manner as to maintain spaces in the recessed portions;
    an expanding unit that deforms, by expanding gas in the spaces, the plastic-deformable material that is coating the substrate, to form plural gaps in the plastic-deformable material, the plural gaps being in correspondence with the respective plural recessed portions in the substrate surface, wherein
    the expanding unit reduces pressure on a surface of the plastic-deformable material coating the substrate surface to expand the gas in the spaces in the recessed portions, an expansion force of the gas causing the gaps to form in the plastic-deformable material coating the substrate surface; and
    a peeling unit configured to peel off the plastic-deformable material in which the gaps have been formed, from the substrate surface.

5. The image display element structure manufacturing apparatus according to claim 4, further comprising:
    a curing unit configured to cure the plastic-deformable material in which the gaps have been formed, wherein
    the peeling unit peels off the plastic-deformable material which has been cured and in which the gaps have been formed, from the substrate surface.

6. The image display element structure manufacturing apparatus according to claim 4, wherein:
    the coating unit comprises an attaching unit configured to attach the plastic-deformable material which is sheet-like to the substrate surface in such a manner as to maintain the spaces in the recessed portions of the substrate surface.

7. The image display element structure manufacturing apparatus according to claim 4, wherein:
    the coating unit comprises an applying unit configured to apply the plastic-deformable coating material on the substrate surface in such a manner as to maintain the spaces in the recessed portions of the substrate surface.

8. The image display element structure manufacturing apparatus according to claim 5, wherein:
    the plastic-deformable material comprises a solution of a water soluble resin; and
    the curing unit dries and cures the plastic-deformable material in which the gaps have been formed under a depressurized environment or in a dry air current.

9. The image display element structure manufacturing apparatus according to claim 5, wherein:
    the plastic-deformable material comprises an energy-line curing resin; and
    the curing unit cures the plastic-deformable material in which the gaps have been formed by irradiating the plastic-deformable material with energy lines.

10. The image display element structure manufacturing apparatus according to claim 4, wherein:

the expanding unit controls at least one of a temperature and a humidity of an atmosphere.

11. The image display element structure manufacturing apparatus according to claim 4, wherein:
the peeling unit peels off the plastic-deformable material that has been cured from the substrate surface by adhering the plastic-deformable material to a base to which an adhesive material or a viscous material has been applied.

12. An electrophoretic image display element manufacturing apparatus comprising the image display element structure manufacturing apparatus according to claim 4, further comprising:
an injecting unit configured to inject, into the gaps formed in the image display element structure, a dispersion liquid comprising a nonpolar solvent and dye dispersed in the nonpolar solvent, which dye has at least one type of an electrophoretic property; and
a sealing unit configured to seal openings of the gaps into which the dispersion liquid has been injected.

13. The electrophoretic image display element manufacturing apparatus according to claim 12, wherein the injecting unit applies the dispersion liquid onto the openings of the gaps formed in the image display element structure, and injects the dispersion liquid into the gaps by pressing the dispersion liquid with a roller or a blade.

14. The electrophoretic image display element manufacturing apparatus according to claim 12, wherein the sealing unit adheres, to the openings of the gaps, a sealing member onto which a sealing film, an adhesive layer, or a viscous layer has been formed beforehand.

15. The electrophoretic image display element manufacturing apparatus according to claim 12, wherein the sealing unit transfers a sealing film that has been formed beforehand onto a surface having the openings of the gaps.

16. The electrophoretic image display element manufacturing apparatus according to claim 12, wherein the sealing unit seals the openings with a sealing film that has been stretched to have a small film thickness.

17. The electrophoretic image display element manufacturing apparatus according to claim 12, further comprising:
an ultrasonic vibration unit configured to stir the dispersion liquid when the dispersion liquid is being injected into the gaps formed in the image display element structure.

18. The image display element structure manufacturing apparatus according to claim 4, wherein the gaps formed in the plastic-deformable material coating the substrate surface by the expanding unit by expanding gas in the spaces have a hollow structure.

19. The image display element structure manufacturing apparatus according to claim 4, wherein the plastic-deformable material peeled off the substrate surface by the peeling unit has a hollow structure.

* * * * *